Patented June 14, 1949

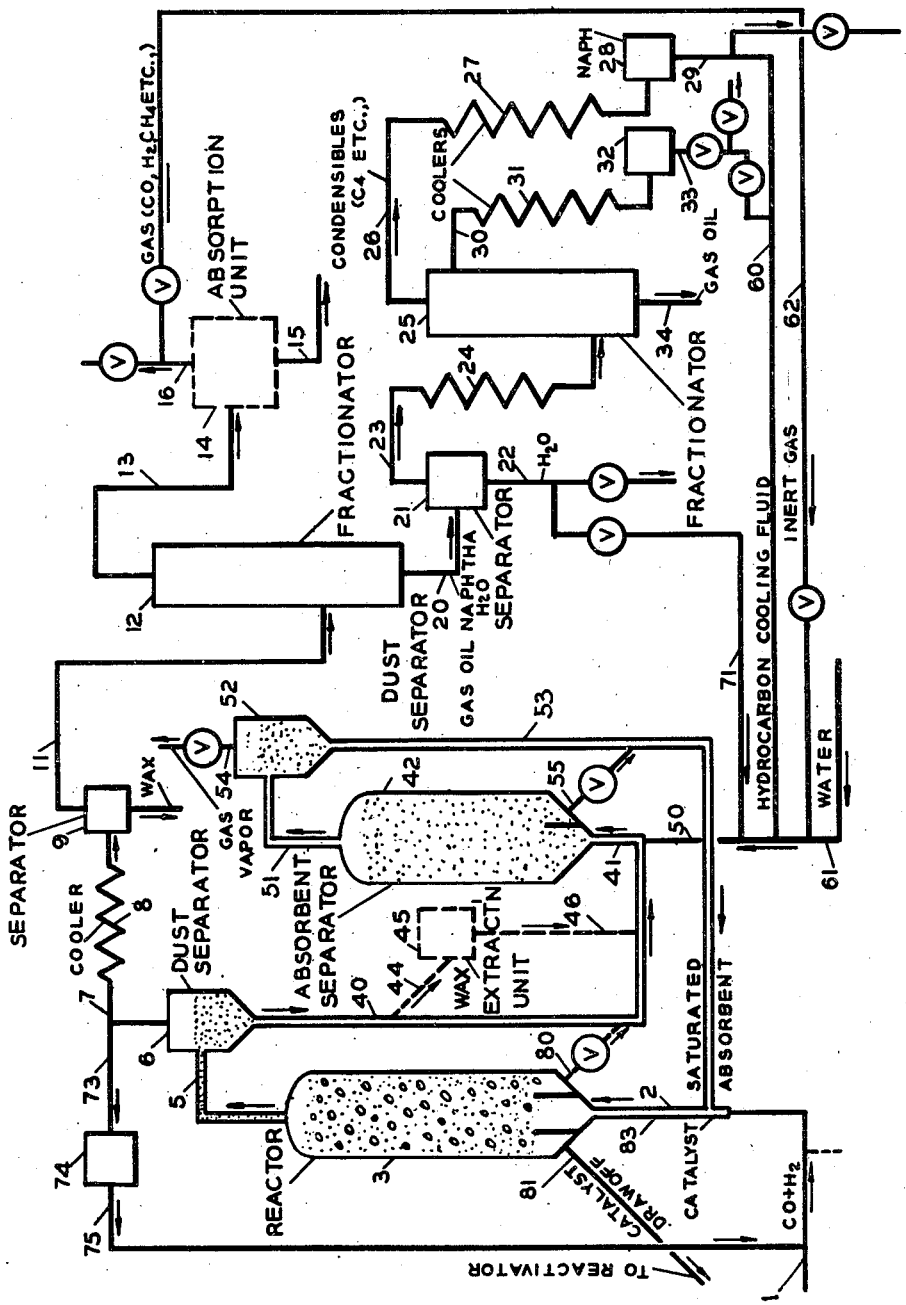

2,473,129

UNITED STATES PATENT OFFICE 2,473,129

METHOD OF CARRYING OUT EXOTHERMIC REACTIONS

Harold V. Atwell, Beacon, N. Y., assignor, by mesne assignments, to The Texas Company, New York, N. Y., a corporation of Delaware Application February 16, 1945, Serial No. 578,307

13 Claims. (Cl. 260—449.6)

This invention relates to a method of carrying out exothermic reactions.

The invention has to do with the removal or dissipation of heat liberated in exothermic reactions such as in the hydrogenation of oxides of carbon to produce compounds having two or more carbon atoms per molecule.

More specifically, the invention involves effecting the reaction in a reaction zone under predetermined conditions of temperature and pressure and introducing to the reaction zone a finely divided solid adsorbent carrier material containing adsorbed or absorbed fluid which is vaporizable therefrom under the conditions of temperature and pressure prevailing within the reaction zone. The carrier passes through the reaction zone continuously and during such passage the fluid is vaporized therefrom by the heat being liberated in the reaction zone. The resulting vaporized fluid is discharged from the reaction zone and the carrier is drawn off. Additional fluid is absorbed in the carrier drawn off from the reaction zone and the carrier containing the additional fluid is recycled to the reaction zone.

Suitable adsorbent carrier materials contemplated comprise silica gel, alumina and charcoal. The fluid used for absorption in, or for saturating, the carrier may be water, alcohol, ammonia or hydrocarbons. It is contemplated that the cooling fluid will vaporize at the temperature and under the pressure prevailing in the reaction zone so that exothermic heat of the reaction is used to provide heat of vaporization of the cooling fluid.

In synthesis reactions wherein carbon monoxide is reacted with hydrogen to produce normally liquid hydrocarbons it is possible that a suitable fraction of the hydrocarbon products may be used as the fluid for absorbing in, or saturating, the carrier passing to the reaction zone.

Where the reactions are carried out in a continuous manner and in which case a stream of reactants is continuously passed to the reaction zone for reaction therein, solid carrier saturated, or partially saturated, with cooling fluid may be injected in granular or powdered form into the feed stream of reactants. In this way, the carrier is suspended in the stream of reactants and resulting products of the reaction flowing through the reaction zone, and likewise the carrier particles are carried out of the reaction zone in the effluent stream of reaction products. During passage through the reaction zone, the cooling fluid is vaporized and expelled from the carrier at or below the reaction temperature, the heat of the reaction being used to provide the heat required for vaporizing the fluid and expelling it from the carrier.

The amount of carrier flowing through the reaction zone and also its content of absorbed fluid as well as the nature of the fluid will depend upon the amount of heat which is to be removed or dissipated from the reaction zone. Conditions may be maintained so that the heat of desorption of fluid from the carrier substantially balances the heat of reaction.

Accordingly, an advantage of the invention involves effecting close control of the temperature prevailing in a reaction zone wherein a reaction of highly exothermic character is being carried out, such as hydrogenation and polymerization reactions.

The invention has application to non-catalytic as well as catalytic reactions. It has particular application in the hydrogenation of carbon monoxide to produce liquid hydrocarbons or other compounds and wherein carbon monoxide and hydrogen are subjected to the action of a synthesis catalyst. The catalyst for this reaction comprises either cobalt, iron or nickel, together with a promoter such as the oxides of thorium, magnesium, uranium and vanadium on a supporting material such as diatomaceous earth or silica gel.

The synthesis reaction, as obtained with the foregoing catalysts, is quite sensitive to temperature. Thus, in carrying out the reaction with a cobalt catalyst for the production of normally liquid hydrocarbons the temperature in the reaction zone must be maintained within a rather narrow critical range of about 360 to 400° F. If the temperature drops below this range, the reaction practically ceases. On the other hand, if the temperature is substantially above this range the product of reaction contains an excessively large amount of gaseous material such as methane.

In accordance with the invention, the foregoing synthesis is advantageously carried out with the catalyst maintained in a fluidized state. A fluidized mass of solid synthesis catalyst is confined within a reaction zone while the reactant gases and suspended carrier powder pass through the fluidized catalyst. The carrier, such as powdered silica gel, is saturated with water at a temperature in the range about 150 to 250° F. before introduction to the reaction zone. The carrier powder is separated from the effluent stream from the reaction zone and, after adding more water to it, is recycled to the entering reactant gas stream.

By employing a fluidized catalyst it is feasible to introduce the carrier powder at a temperature substantially below the reaction temperature without causing the temperature of the catalyst mass as a whole to drop below that necessary to maintain the synthesis reaction. Due to the fluidized condition of the catalyst, a uniform temperature level prevails throughout the mass even though individual catalyst particles make frequent and repeated contact with relatively cool particles of carrier powder.

Reference will now be made to the accompanying drawing which comprises a flow diagram illustrating one mode of application of the invention for carrying out the hydrogenation of carbon monoxide to produce normally liquid hydrocarbons.

As shown in the drawing, carbon monoxide and hydrogen usually in the proportion of about 1 mol of carbon monoxide to 2 mols of hydrogen are drawn from a source not shown through a pipe 1 which communicates with a vertical conduit 2. The conduit 2 leads to the bottom of a vertical reaction vessel 3.

The carbon monoxide and hydrogen are advantageously preheated to about 365° F. prior to introduction to the conduit 2. In the reaction vessel 3, the gases are subjected to intimate contact with a synthesis catalyst which may comprise, for example, about 32% cobalt, 64% Filter Cel, and about 4% thorium and magnesium oxides by weight.

The catalyst is in the form of relatively dense particles or granules of about 50 to 150 microns in diameter. The rate of gas flow through the reactor is sufficiently high to maintain these catalyst particles suspended in the gas body but insufficient to carry the catalyst particles out of the top of the reactor, at least to any substantial extent.

The effluent stream comprising gaseous and liquid hydrocarbons, unreacted carbon monoxide and hydrogen, as well as water vapor is continuously passed through a conduit 5 to a dust separator 6. The function of the dust separator is to remove the entrained particles of solid carrier material which, as will be described later, are introduced to the reactor 3 through the conduit 2.

The carrier comprising silica gel, for example, having a particle size in the range about 10 to 50 microns is relatively less dense than the catalyst particles, which latter are retained in the reactor. Since the carrier particles are relatively less dense, they rise through the suspended or fluidized catalyst mass in the reactor.

The separator 6 may be of either the centrifugal or electrical type or may comprise a combination of these types.

The gas and vaporized hydrocarbon products of reaction leave the separator 6 through a pipe 7 and are passed through a cooler 8.

From the cooler 8 the stream is passed to a separator 9 wherein high boiling material, mostly of waxy nature, is separated and drawn off.

The lower boiling hydrocarbons and gas are passed through a pipe 11 to a fractionator or fractionating unit 12. The fractionation is carried out so as to separate normally gaseous material from the gas oil, naphtha and water. The gaseous fraction is passed through pipe 13 to an absorption unit 14, shown diagrammatically.

In the unit 14, the gaseous stream may be subjected to contact with a suitable adsorbent material such as silica gel or charcoal so as to absorb condensible hydrocarbons having 3 to 4 carbon atoms per molecule. These condensibles are discharged through a pipe 15.

The residual gases, including carbon monoxide, hydrogen, methane, etc., are drawn off through a pipe 16 and may be further processed to recover carbon monoxide and hydrogen therefrom for recycling to the reactor 3. The methane may also be recovered for subsequent conversion into synthesis gas. The residual gas fraction or any portion thereof may be passed to a synthesis gas generator, not shown.

The residual liquid fraction drawn off from the bottom of fractionator 12 through a pipe 20 is passed to a separator 21 to permit settling of water which is discharged through a pipe 22.

The hydrocarbons, including naphtha and gas oil, are passed through a pipe 23 and heater 24 and from there to a fractionator or fractionating unit 25.

The fractionating unit 25 is operated so as to separate the hydrocarbons into any number of fractions of desired boiling range. Thus, the operation may be conducted so as to separate the naphtha from the higher boiling gas oil constituents.

As indicated, a naphtha fraction may be removed as a distillate through a pipe 26 and condenser 27 to a drum 28. The condensed naphtha is discharged from the drum 28 through a pipe 29.

A side stream comprising either higher boiling naphtha or hydrocarbons boiling in the range of kerosene or Diesel oil or a fraction comprising light gas oil is drawn off through a pipe 30 and cooler 31 to a drum 32 from which it is discharged through a pipe 33.

Gas oil or other higher boiling constituents are drawn off as a residual fraction through pipe 34.

The carrier material is removed from the separator 6 through a conduit 40 which communicates with a conduit 41 leading into the bottom of a vessel 42 wherein the carrier is saturated with water at a temperature of about 150 to 250° F.

In some instances, it may be desired to treat the carrier with solvent or other suitable agent to remove adhering waxy material. In such case, provision may be made for drawing off the carrier through a branch pipe 44 to an extraction unit 45, shown diagrammatically, wherein the carrier is extracted with a solvent such as benzene for the purpose of removing the adhering waxy material.

The so treated carrier is then passed through conduit 46 and then conducted to the vessel 42.

The vessel 42 is substantially similar in design and operation to the reactor 3.

A stream of inert gas containing the cooling fluid, in this case water from a pipe 61, dispersed therein is conducted from a pipe 50 into the conduit 41 at sufficiently high velocity to carry the carrier powder or particles into the vessel 42 and to maintain them suspended in the body of gaseous material moving upwardly through the vessel. The gas used may be from an external source. Gas and suspended solid particles are carried out of the top of the vessel 42 through a conduit 51 to a separating unit 52 which may be substantially similar to the separator 6 previously mentioned. The entrained carrier particles are separated from the residual gas and removed from the separator through a conduit or standpipe 53 while the residual gas is discharged through pipe 54. Provision may be made for dispersing more water in this residual gas and then recycling it through the vessel 42.

The conduit 53 communicates with the previously-mentioned conduit 2 leading to the reactor 3.

Some of the carrier particles may settle in the lower portion of the vessel 42. Therefore, provision may be made for removing this material from the baffled section at the bottom of the vessel 42 through a conduit 55 which communicates with the conduit 53 as indicated.

The carrier flowing through the conduits 53 and 55 contains cooling fluid which it has absorbed during passage through the vessel 42 and consequently is now in a condition for return to the reactor 3.

The inert gas used for propelling the absorbent particles through the vessel 42 may be from an internal source such as the residual gas discharged from the absorption unit 14. In this case, a branch pipe 62 provides a means for diverting all or a portion of the inert gas from a pipe 16 into the previously mentioned pipe 50 leading to the vessel 42.

Water used as a cooling fluid for saturating the carrier in the vessel 42 may be that drawn off from the drum 21 through a pipe 22. The water so used may be passed through a pipe 70 communicating with the pipe 50.

While not shown, provision may be made for adjusting the temperature of the gaseous mixture passing through the pipe 50. For example, this mixture may enter the conduit 41 at a temperature not in excess of about 300° F. and preferably in the range about 150 to 250° F.

While the catalyst in the reactor 3 has been described as being maintained suspended in the reaction vessel, nevertheless it is contemplated that a fixed contact mass may be employed under certain circumstances. For example, the synthesis catalyst may be in the form of Raschig rings or in some other form which permits flow of the gas and solid granular absorbent through the contact mass without an excessive pressure gradient. The contact mass should permit relatively easy flow therethrough of the reactant gases laden with solid granular absorbent.

According to another modification contemplated, the synthesis catalyst may move through the reaction zone. Thus, a physical mixture of solid catalyst particles and carrier particles may be injected in the feed stream of reactants and move through the reaction zone while remaining suspended in the flowing gases. The composite mixture is continuously removed in the effluent stream and subjected to separation. The separated mixture of catalyst and carrier is then subjected to contact with additional cooling fluid to saturate the carrier particles, following which the mixture is returned to the reaction zone.

In this latter type of operation, provision may be made for accumulating some of the solid mixture in the bottom or baffled section of the reactor 3 from which it is drawn off either through a conduit 80 for resaturation with the cooling fluid, or through a conduit 81 for reactivation of the catalyst portion of the mixture by treatment with hydrogen at elevated temperature so as to remove the waxy material adhering thereto.

Make-up catalyst may be drawn from a source not shown through a pipe 83 and injected into the stream of fluid rising through the conduit 2.

The cooling fluid may be a fraction of the hydrocarbon products produced in the process, which fraction boils either approximately at or substantially below the average reaction temperature, or in the lower range of temperature prevailing within the reactor 3. This fraction may be the previously-mentioned side stream drawn off from the fractionator 25 and accumulated in the drum 32. The pipe 33 through which the hydrocarbon liquid is discharged from the drum 32 communicates with a pipe 60 which in turn communicates with the previously-mentioned pipe 50.

In the actual operation for the production of normally liquid hydrocarbons the carbon monoxide and hydrogen are continuously introduced to the reactor 3 in the proportion of about 1 mol of carbon monoxide to 2 mols of hydrogen at a temperature of about 360 to 380° F. With a cobalt type of catalyst, the amount of heat liberated by the reaction amounts to about 70 B. t. u. per cubic foot of entering gas mixture.

The temperature of the effluent hydrocarbon stream from the reactor is maintained at about 400° F. by continuously vaporizing within the reactor sufficient cooling fluid such as water contained in a silica gel carrier powder flowing through the reactor. One pound of silica gel at a temperature of about 150° F. carries about 0.3 pound of water which is equivalent to about 350 B. t. u. Therefore, the silica gel saturated with water at about 150° F. is continuously introduced to the reactor 3 in the proportion of about 1 pound per 5 cubic feet of entering gas mixture, including recycled gas, measured at 60° F. and atmospheric pressure.

It is contemplated that the synthesis process may be modified to include provision for recycling of a portion of the reaction products. Thus, a portion of the effluent leaving the separator 6 may be diverted through a pipe 73, heat exchanger 74, and pipe 75 to the pipe 1. The recycled stream may be cooled and thus used as a means of removing some of the heat of reaction.

While a cobalt catalyst has been described with reference to the flow diagram, it is contemplated that other hydrogenation catalysts may be used, such as an iron type catalyst. With an iron type catalyst a somewhat higher reaction temperature is employed, for example in the range 450 to 550° F.

Obviously many modifications and variations of the invention as above set forth may be made without departing from the spirit and scope thereof, and therefore only such limitations should be imposed as are indicated in the appended claims.

I claim:

1. In a conversion reaction process involving a reaction of exothermic character the method of removing heat of reaction and controlling the reaction temperature which comprises effecting said exothermic reaction in a reaction zone at a predetermined elevated temperature, continuously passing to the zone a stream of solid granular adsorbent carrier material containing adsorbed fluid which is vaporizable therefrom under the conditions of temperature and pressure prevailing within the reaction zone, passing said carrier through the reaction zone in intimate contact with the reactants undergoing reaction therein, vaporizing fluid from the carrier during said passage through the zone by said exothermic heat of reaction, removing vaporized fluid and reacted material from the reaction zone, continuously removing from the reaction zone a stream of carrier from which fluid has been vaporized, reducing the temperature of removed carrier substantially below said predetermined temperature, absorbing further said fluid in the cooled removed carrier during its absence from the reaction zone, and returning it to the reaction zone substantially free of unabsorbed liquid.

2. In a conversion reaction process involving a reaction of exothermic character the method of removing heat of reaction and controlling the reaction temperature which comprises continuously passing through a reaction zone a stream of reactants, effecting said exothermic reaction therein at a predetermined elevated temperature, suspending in said reactant stream solid granular adsorbent carrier material containing adsorbed fluid which is vaporizable therefrom under the conditions of temperature and pressure prevailing within the reaction zone, vaporizing from the carrier within the reaction zone said absorbed fluid by the exothermic heat of reaction, removing a stream of reacted material including said vaporized fluid, continuously removing from the reaction zone carrier from which fluid has been vaporized, reducing the temperature of removed carrier substantially below said predetermined temperature, absorbing further said fluid in the removed cooled carrier during its absence from the reaction zone, and recycling it to the reaction zone substantially free of unabsorbed liquid.

3. In a conversion reaction process involving a reaction of exothermic character the method of removing heat of reaction and controlling the reaction temperature which comprises continuously passing through a reaction zone a stream of reactants, effecting said exothermic reaction therein at a predetermined elevated temperature, suspending in said reactant stream solid granular adsorbent carrier material substantially saturated with adsorbed fluid which is vaporizable under the conditions of temperature and pressure prevailing within the reaction zone, vaporizing from the carrier within the reaction zone said absorbed fluid by the exothermic heat of reaction, removing a stream of reacted material including said vaporized fluid, continuously removing from the reaction zone carrier from which fluid has been vaporized, reducing the temperature of removed carrier substantially below said predetermined temperature, saturating the withdrawn carrier with further said fluid during its absence from the reaction zone, and recycling it to the reaction zone substantially free of unabsorbed liquid.

4. In the continuous catalytic hydrogenation of an oxide of carbon to form compounds having two or more carbon atoms per molecule by contact with a hydrogenation catalyst, said hydrogenation reaction being of exothermic character, the steps comprising maintaining a reaction zone containing said catalyst under conditions such that the oxide is hydrogenated to form said compounds, continuously passing hydrogen and carbon oxide to said reaction zone for contact with the catalyst at a predetermined elevated temperature, continuously introducing to said reaction zone a stream of solid granular adsorbent carrier material containing adsorbed fluid vaporizable therefrom under the conditions of temperature and pressure prevailing within the reaction zone, passing said carrier through the reaction zone in intimate contact with said catalyst, vaporizing said fluid from the carrier during passage through the reaction zone by said exothermic heat of reaction, removing products of reaction including vaporized fluid from the reaction zone, continuously removing from the reaction zone a stream of carrier from which fluid has been vaporized, reducing the temperature of removed carrier substantially below said predetermined temperature, absorbing further said fluid in the cooled removed carrier during its absence from the reaction zone and returning it to the reaction zone substantially free of unabsorbed liquid.

5. The process according to claim 4 in which the carrier passing to the reaction zone contains absorbed therein a liquid boiling at approximately the reaction temperature.

6. In the continuous catalytic hydrogenation of an oxide of carbon to form compounds having two or more carbon atoms per molecule by contact with a hydrogenation catalyst, said hydrogenation reaction being of exothermic character, the steps comprising passing carbon monoxide and hydrogen through a reaction zone at relatively high velocity in the gas phase, maintaining suspended in the body of gas within the reaction zone said hydrogenation catalyst in the form of relatively dense solid particles, effecting hydrogenation of the oxide to form said compounds at a predetermined elevated temperature, continuously introducing to said reaction zone a stream of solid granular adsorbent carrier material relatively less dense than the catalyst and containing absorbed fluid vaporizable under the conditions of temperature and pressure prevailing within the reaction zone, passing the carrier through the suspended catalyst, vaporizing fluid from the carrier during said passage by said exothermic heat of reaction, continuously discharging products of reaction including vaporized fluid from the reaction zone, continuously removing from the reaction zone carrier from which fluid has been vaporized, reducing the temperature of removed carrier substantially below said predetermined temperature, absorbing further fluid in withdrawn carrier during its absence from the reaction zone, and returning the carrier containing added fluid to the reaction zone.

7. In the continuous catalytic hydrogenation of an oxide of carbon to form compounds having two or more carbon atoms per molecule by contact with a hydrogenation catalyst, said hydrogenation reaction being of exothermic character, the steps comprising passing a stream of carbon monoxide and hydrogen to the reaction zone, maintaining within the reaction zone a body of carbon monoxide and hydrogen gas flowing therethrough at relatively high velocity, suspending in said body said hydrogenation catalyst in the form of relatively dense solid particles, maintaining the reaction zone under predetermined conditions of elevated temperature and pressure such that carbon monoxide is hydrogenated to form said compounds, injecting into said stream passing to the reaction zone solid granular adsorbent carrier in the form of particles relatively less dense than the catalyst, said carrier containing absorbed water, passing said carrier through the reaction zone, vaporizing water from the carrier during said passage, continuously removing from the reaction zone a stream of reaction products including vaporized water and carrier from which it has been vaporized, separating from the removed stream the carrier contained therein, reducing the temperature of separated carrier substantially below said predetermined temperature, substantially saturating said separated and cooled carrier with further water at substantially below said predetermined temperature during its absence from the reaction zone, and recycling the saturated carrier to the stream of entering feed.

8. In a conversion reaction process involving a catalytic reaction of exothermic character the method of removing heat of reaction and controlling the reaction temperature which comprises maintaining within a reaction zone a fluidized mass of solid catalyst particles at predetermined pressure and elevated temperature, continuously passing through said catalyst mass a gaseous reactant stream having suspended therein finely divided solid adsorbent relatively less dense than said catalyst and being substantially inert catalytically with respect to said exothermic reaction, adsorbing in said adsorbent prior to introduction to the reaction zone and while at a temperature substantially below said predetermined temperature liquid which is vaporizable therefrom at the temperature and pressure prevailing within the reaction zone, effecting substantial conversion of gaseous reactants during contact with the catalyst with liberation of exothermic heat, vaporizing liquid from said adsorbent during passage through the catalyst, removing from the reaction zone an effluent stream of gas containing products of reaction and suspended adsorbent and substantially free from catalyst, separating adsorbent from said effluent stream and recycling separated adsorbent, after cooling and readsorption of further vaporizable liquid, to the reaction zone.

9. In the continuous catalytic hydrogenation of an oxide of carbon to form compounds having two or more carbon atoms per molecule by contact with a synthesis catalyst, the method comprising maintaining within a reaction zone a fluidized mass of solid synthesis catalyst particles at predetermined pressure and elevated temperature, continuously passing through said catalyst mass a gaseous reactant stream containing carbon monoxide and hydrogen and having suspended therein finely divided solid adsorbent relatively less dense than said catalyst, adsorbing in said adsorbent prior to introduction to the reaction zone and while at a temperature substantially below said predetermined temperature liquid vaporizable therefrom at the temperature and pressure prevailing within the reaction zone effecting substantial conversion of carbon monoxide and hydrogen into higher molecular weight compounds with liberation of exothermic heat, vaporizing liquid from said adsorbent during passage through the catalyst mass, continuously removing from the reaction zone an effluent stream of gas containing products of reaction and suspended adsorbent said stream being substantially free from catalyst, separating adsorbent from said effluent stream and recycling separated adsorbent, after cooling and readsorption of further vaporizable liquid, to the reaction zone.

10. In a conversion reaction process involving a catalytic reaction of exothermic character the method of removing heat of reaction and controlling the reaction temperature which comprises maintaining within a reaction zone a fluidized mass of solid catalyst particles at predetermined pressure and elevated temperature, continuously passing through said catalyst mass a gaseous reactant stream having suspended therein finely divided solid adsorbent relatively less dense than said catalyst, adsorbing in said adsorbent prior to introduction to the reaction zone and while at a temperature substantially below said predetermined temperature liquid which is vaporizable therefrom at the temperature and pressure prevailing within the reaction zone, effecting substantial conversion of gaseous reactants during contact with the catalyst with liberation of exothermic heat, vaporizing liquid from said adsorbent during passage through the catalyst, and removing from the reaction zone an effluent stream of gas containing products of reaction and suspended adsorbent and substantially free from catalyst.

11. In the continuous catalytic hydrogenation of an oxide of carbon to form compounds having two or more carbon atoms per molecule by contact with a synthesis catalyst, the method comprising maintaining within a reaction zone a fluidized mass of solid synthesis catalyst particles at predetermined pressure and elevated temperature, continuously passing through said catalyst mass a gaseous reactant stream containing carbon monoxide and hydrogen and having suspended therein finely divided solid adsorbent relatively less dense than said catalyst, adsorbing in said adsorbent prior to introduction to the reaction zone and while at a temperature substantially below said predetermined temperature liquid vaporizable therefrom at the temperature and pressure prevailing within the reaction zone effecting substantial conversion of carbon monoxide and hydrogen into higher molecular weight compounds with liberation of exothermic heat, vaporizing liquid from said adsorbent during passage through the catalyst mass, and continuously removing from the reaction zone an effluent stream of gas containing products of reaction and suspended adsorbent said stream being substantially free from catalyst.

12. In a conversion reaction process involving a reaction of exothermic character, the method of removing heat of reaction and controlling the reaction temperature which comprises effecting said exothermic reaction in a reaction zone at a predetermined, elevated temperature, continuously passing to the said zone a stream of solid, granular, adsorbent carrier material, substantially inert catalytically with respect to the said exothermic reaction and containing adsorbed fluid which is vaporizable therefrom under the conditions of temperature and pressure prevailing within the reaction zone, effecting the introduction of said carrier material in a condition substantially free of unabsorbed liquid, passing said carrier through the reaction zone in intimate contact with the reactants undergoing reaction therein, vaporizing fluid from the carrier during said passage through the zone by said exothermic heat of reaction, removing vaporized fluid and reacted material from the reaction zone, and removing from the reaction zone carrier from which fluid has been vaporized.

13. In the continuous exothermic catalytic hydrogenation of an oxide of carbon to form compounds having two or more carbon atoms per molecule by contact with a synthesis catalyst, the method comprising providing a reaction zone containing a mass of solid synthesis particles at predetermined pressure and elevated temperature, continuously passing through said catalyst mass a gaseous reactant stream containing hydrogen and carbon monoxide, continuously introducing to said reaction zone a stream of solid, granular, adsorbent carrier material which is substantially inert catalytically with respect to said exothermic reaction and containing an adsorbed fluid vaporizable therefrom under the conditions of temperature and pressure prevailing within the reaction zone, effecting a substantial conversion of the hydrogen and carbon monoxide into said higher molecular weight compounds with the liberation of exothermic heat, vaporizing liquid from said adsorbent during passage through the reaction zone by said exothermic heat of reaction, continuously removing from the reaction zone a stream of carrier from which fluid has been vaporized, and removing from said zone products of reaction, including said vaporized fluid.

HAROLD V. ATWELL.

REFERENCES CITED

The following references are of record in the file of this patent:

UNITED STATES PATENTS

| Number | Name | Date |
|---|---|---|
| 2,309,034 | Barr | Jan. 19, 1943 |
| 2,312,006 | Thiele | Feb. 23, 1943 |
| 2,356,680 | Marancik | Aug. 22, 1944 |
| 2,367,351 | Hemminger | Jan. 16, 1945 |
| 2,376,564 | Upham | May 22, 1945 |
| 2,393,636 | Johnson | Jan. 29, 1946 |
| 2,393,909 | Johnson | Jan. 29, 1946 |
| 2,406,851 | Redcay | Sept. 3, 1946 |
| 2,417,164 | Huber, Jr. | Mar. 11, 1947 |